US011183020B2

(12) United States Patent
Berman et al.

(10) Patent No.: US 11,183,020 B2
(45) Date of Patent: Nov. 23, 2021

(54) GAMING SYSTEMS, APPARATUSES AND METHODS EMPLOYING PARTIAL WINNING COMBINATION FEATURES

(71) Applicant: KING SHOW GAMES, INC., Minnetonka, MN (US)

(72) Inventors: Bradley Berman, Minnetonka, MN (US); Chad Shapiro, Plymouth, MN (US)

( * ) Notice: Subject to any disclaimer, the term of this patent is extended or adjusted under 35 U.S.C. 154(b) by 0 days.

(21) Appl. No.: 16/579,179

(22) Filed: Sep. 23, 2019

(65) Prior Publication Data

US 2020/0020201 A1 Jan. 16, 2020

Related U.S. Application Data

(63) Continuation of application No. 15/386,701, filed on Dec. 21, 2016, now Pat. No. 10,424,161, which is a continuation of application No. 13/295,829, filed on Nov. 14, 2011, now Pat. No. 9,530,285.

(60) Provisional application No. 61/412,649, filed on Nov. 11, 2010.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ...... *G07F 17/3267* (2013.01); *G07F 17/3213* (2013.01); *G07F 17/3244* (2013.01); *G07F 17/3262* (2013.01); *G07F 17/3293* (2013.01); *G07F 17/34* (2013.01)

(58) Field of Classification Search

CPC ............. G07F 17/3293; G07F 17/3267; G07F 17/3246; G07F 17/3244; G07F 17/34; G07F 17/326; G07F 17/3211; G07F 17/3258; G07F 17/3288; G07F 17/3213; A63F 2001/005; A63F 13/00; A63F 1/00

See application file for complete search history.

(56) References Cited

U.S. PATENT DOCUMENTS 6,149,521 A * 11/2000 Sanduski ............ G07F 17/3267 273/143 R
6,159,095 A * 12/2000 Frohm ................ G07F 17/3227 463/19
6,270,412 B1 8/2001 Crawford et al.

(Continued)

*Primary Examiner* — Justin L Myhr

(57) ABSTRACT

Embodiments of the present invention set forth systems, apparatuses and methods for employing techniques used in providing a mid-game enhancement feature(s) in response to a presented subset of virtual cards. Here, a gaming device may involve a video poker game having a first poker hand and a second poker hand, where each of the first poker hand and the second poker hand have a predetermined number of card positions. During play of the gaming device, cards are dealt to each of the card positions in the first poker hand, where it is determined if a minimum win criterion is met after each subset combination of cards is dealt. If a minimum win criterion is determined to be satisfied, the currently dealt subset of cards is copied from the first poker hand to the second poker hand and an enhancement feature is triggered. Thereafter, additional cards are individually dealt to the remaining card positions in the first poker hand and the second poker hand.

5 Claims, 15 Drawing Sheets

(56) References Cited

U.S. PATENT DOCUMENTS

| | | | | |
|---|---|---|---|---|
| 6,435,509 | B2 * | 8/2002 | Wichinsky | A63F 1/00 273/274 |
| 7,247,092 | B2 * | 7/2007 | Jarvis | G07F 17/32 273/292 |
| 2004/0219970 | A1 * | 11/2004 | Tarantino | A63F 1/00 463/20 |
| 2006/0068892 | A1 | 3/2006 | Gomez et al. | |
| 2007/0060295 | A1 | 3/2007 | DeMar et al. | |
| 2008/0146305 | A1 * | 6/2008 | Moody | G07F 17/3244 463/13 |
| 2009/0239634 | A1 | 9/2009 | Nguyen | |
| 2011/0105218 | A1 | 5/2011 | Anderson et al. | |
| 2013/0310127 | A1 * | 11/2013 | Berman | G07F 17/3244 463/13 |

* cited by examiner

GAMING SYSTEMS, APPARATUSES AND METHODS EMPLOYING PARTIAL WINNING COMBINATION FEATURES

RELATED APPLICATIONS

This application claim is a continuation of U.S. application Ser. No. 15/386,701, filed Dec. 21, 2016, now U.S. Pat. No. 10,424,161, which is a continuation of U.S. application Ser. No. 13/295,829, filed Nov. 14, 2011, now U.S. Pat. No. 9,530,285, which claims the benefit of priority to Provisional Patent Application No. 61/412,649, filed on Nov. 11, 2010, to which priority is claimed pursuant to 35 U.S.C. § 119(e), both of which are incorporated herein by reference in their entirety.

FIELD OF THE INVENTION

This disclosure relates generally to gaming systems and devices, and more particularly to gaming systems, apparatuses, and methods employing partial winning combination features.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

Various embodiments described herein are generally directed to games, and more particularly to systems, apparatuses and methods for providing game features, such as slot game features. Techniques are described involving, for example, providing a mid-spin enhancement feature(s) in response to the presented subset of symbols.

In accordance with one embodiment, a method is provided that includes spinning all reels of a slot game, and achieving a minimum win combination criteria based on a result of a subset of the reels that have stopped spinning. The remaining reels continue to spin, and an enhanced feature is activated while the remaining reels continue to spin. The remaining reels stop spinning, and results are provided based on at least the result of the reels and the activated enhanced feature.

In accordance with another embodiment, a method is provided that includes presenting a hand of cards of a poker game on a video display. A minimum win combination criteria is achieved based on a result of a subset of the cards that have been revealed. The remaining cards other than the subset that have been revealed continue to be concealed, at which time an enhanced feature is activated. The remaining cards are revealed, and results are provided based on at least the result of the hand of cards and the activated enhanced feature.

These and other features and aspects of various embodiments may be understood in view of the following detailed discussion and accompanying drawings.

BRIEF DESCRIPTION OF THE DRAWINGS

The description below makes reference to the following figures, wherein the same reference number may be used where indicated to identify corresponding items across figures.

DETAILED DESCRIPTION

Figure 1:
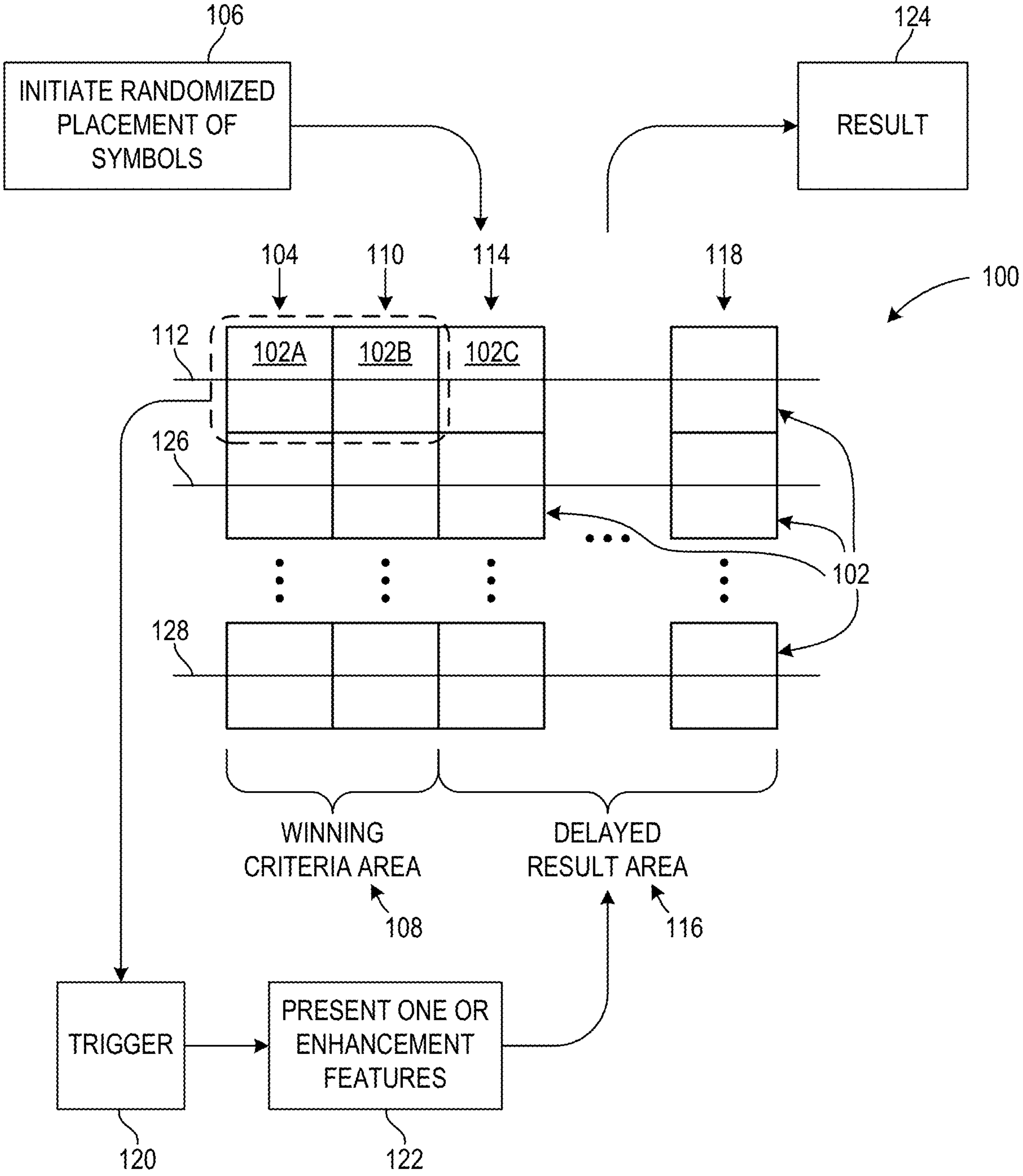
FIG. 1 is a block diagram illustrating a representative manner in which one or more enhancement features may be provided during a temporarily suspected symbol presentation of a gaming activity.

The present disclosure is generally directed to games, and more particularly to systems, apparatuses and methods for providing game features, such as slot game features. It is desirable to provide captivating gaming opportunities for game players to maintain player interest, particularly where there are multiple chances of winning and/or increasing payout awards. In furtherance of the need to attract participants to particular gaming machines, there is a continuing need to further the excitement and anticipation in the participation of gaming activities.

In the following description of various exemplary embodiments, reference is made to the accompanying drawings which form a part hereof, and in which is shown by way of illustration various representative embodiments in which the invention may be practiced. It is to be understood that other embodiments may be utilized, as structural and operational changes may be made without departing from the scope of the present disclosure.

Embodiments described below may be used in connection with primary gaming activities and/or bonus gaming activities. The embodiments may be implemented in a stand-alone game, a primary/base game of a slot game, a bonus game of a slot game, server-based games, etc.

Embodiments described herein include slot games that involve providing an enhancement feature at some point during the symbol randomization or "spinning" of reels or other symbol locations of a slot game. After one or more physical reels, virtual reels or other symbol locations have presented resulting symbols during a gaming event, one or more other physical/virtual reels or other symbol locations will remain in a state where the resulting symbols are unknown. For example the other reels may continue "spinning," whether such spinning is a result of physical reels actually spinning or virtual reels presenting an appearance of spinning reels. As another example, the other reels may merely refrain from revealing symbols at their respective symbol locations, at least temporarily. During this time where one or more symbol locations have revealed a symbol(s) and one or more other symbol locations have not, enhancement features may be presented. Such enhancement features may heighten the anticipation by providing multiplier values or other values that may impact a final result when all symbol locations have revealed a symbol(s). Other embodiments may involve enhancement features that do not impact a final result (e.g., free spins), but the final result of the gaming activity is essentially suspended with some symbols revealed and some not revealed while the enhancement feature(s) is presented to the player.

In one particular embodiment, a "minimum winning combination" feature occurs whenever a threshold condition(s) exists to make a winning combination in the game, which may be presented on the game screen. A minimum winning combination could be applied to any game of chance, in which game play items are revealed in a sequential manner. This includes, but is not limited to, games such as slot machines, card games, and dice games.

For illustrative purposes, a 5-reel slot machine using a 3×5 grid is mentioned and depicted throughout this document, although any game or grid configuration using a sequential method to reveal game play items could be used to apply the ideas described herein. On a 5-reel slot machine, where a representative minimum win is defined as getting three like symbols on consecutive reels on a played line starting with the leftmost reel, a minimum winning combination could be considered getting wild symbols on the same played line on reels 1 and 2. Even though a 3-like symbol pay combination has not yet occurred in such an example, in many popular configurations, a winning combination would be imminent with any symbol landing on the same played line on the $3^{rd}$ reel (due to the presence of two preceding wild card symbols).

When a minimum winning combination occurs, features may be offered, anticipation may be created, and/or enhancements offered to make the experience more exciting to the player. Features, anticipation elements, and enhancements could include, but are not limited to items such as offering the player enhanced pay schedules, such as higher payouts for matching symbol combinations. Premium reel strips in slot games, premium cards/decks in video poker games, and the like may be presented as an enhancement feature to increase the chances, or at least the appearance of an increased chance, of obtaining a higher payout. For example, premium reel strip(s) may include a higher percentage than normal of wild symbols, higher value symbols, etc. Other features may provide free spins, multiple games and/or multiple chances, multiple draws in video poker embodiments, etc. Other enhancement features could include mathematical enhancements such as multiplier values, exponent values, etc.

Still other features may involve highlighting and marking minimum winning combination symbols and elements, to increase anticipation. Another embodiment involves extending the reel-spins, or draw time for the remaining reels or game element positions (card positions for example) to increase anticipation. Sounds may be played, and/or other perceivable actions may be presented to denote that the minimum winning combination has been activated, and/or to articulate that additional reels or game element positions are in enhanced mode. Additionally, features may include displaying messages, animations, pay schedules or other elements to the player to reinforce that a minimum winning combination is present.

FIG. 1 is a block diagram illustrating a representative manner in which one or more enhancement features may be provided during a temporarily suspected symbol presentation of a gaming activity. In this embodiment, a slot game grid 100 includes a plurality of symbol elements 102, which represent locations where a symbol(s) may be presented. The symbol elements 102 may individually present symbols, or multiple symbol elements 102 may collectively form a symbol reel. For example, the symbol elements 102 in column 104 may collectively form a "reel," although this is not relevant to the random presentation of symbols in the symbol elements 102 of the grid 100.

A randomized placement of symbols is initiated, as depicted at block 106. This randomization is described herein as "spinning" the reels, although there may be no actual spinning function in some cases, such as in the case of a video presentation of symbols. In one embodiment, a winning criteria area 108 is determined. For example, in an embodiment where the winning criteria is three consecutive matching symbols, then the first two reels 104, 110 may be considered a winning criteria area where two wild symbols are provided on a payline 112 of reels 104, 110. For example, assuming that symbol elements 102A and 102B of reels 104, 110 respectively present wild symbols, it is known in one embodiment that any next symbol in column 114 will produce at least a 3-symbol payout.

In other embodiments, the winning criteria could involve a greater number of symbol elements 102, such as the first three symbol elements 102A, 102B, 102C of payline 112. Such an embodiment may involve a payout that is now known, rather than imminent as was in the case of two wild symbols in the first two columns 104, 110. Where a symbol combination of three, four or five matching symbols provides a payout, matching three symbols suggests a winning condition, although the payout may increase if more matching symbols are ultimately presented on that payline.

The occurrence of winning criteria in the winning criteria area 108 serves as a trigger 120 to cause one, more or all of the remaining symbol elements 102 to continue "spinning." Thus, when it is known that a winning condition is present or imminent, a portion of the grid 100 may serve as a delayed result area 116, where the randomization or "spinning" of symbols in the remaining symbol elements 102 of columns 114, 118 continues. This in effect temporarily suspends completion of the gaming activity.

During the temporary continuance of spinning in the delayed result area 116, one or more enhancement features may be presented, as depicted at block 122. For example, upon recognition of the trigger 120, a random increasing progression of multiplier values may be presented (e.g., 2× . . . 3× . . . 4× . . . ). At some point, the enhancement feature is selected, which enables the delayed result area 116 to reveal the symbols on the respective symbol elements 102. The symbols associated with the symbol elements 102 of the delayed result area 116 may begin to be presented while the enhancement features are presented, or the presentation of any of the symbols associated with the symbol elements 102 of the delayed result area 116 may be delayed until the enhancement feature(s) has been established. When all symbols have been revealed, a final result 124 may be determined for the paylines 112, 126, 128 (or scatter pays, etc.) of the game, taking into account any enhancement features 122 obtained during play of the gaming activity.

Figure 2A:
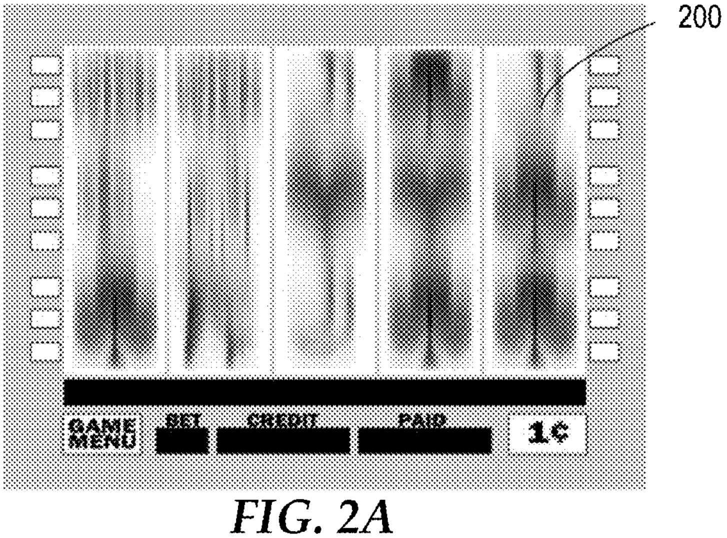
FIGS. 2A-2C illustrate an example of a minimum winning combination that may be used to trigger an enhancement feature(s)
Figure 2B:
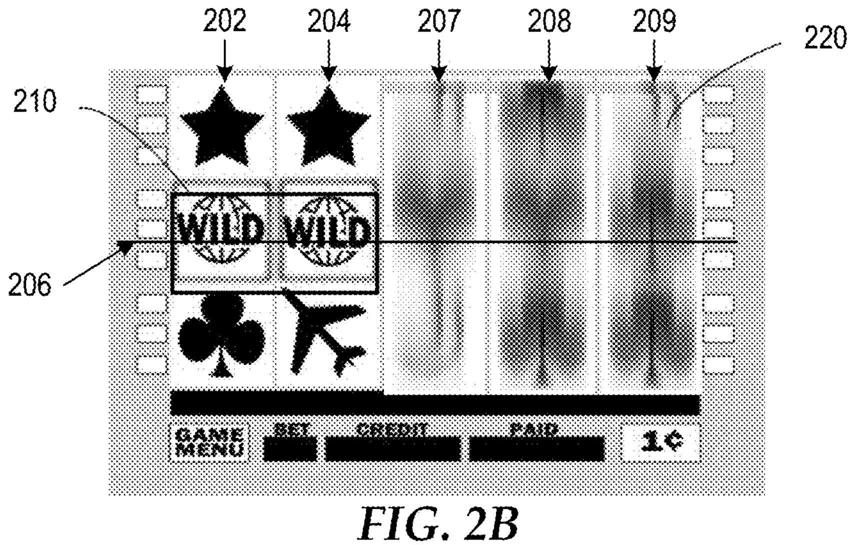
Figure 2C:
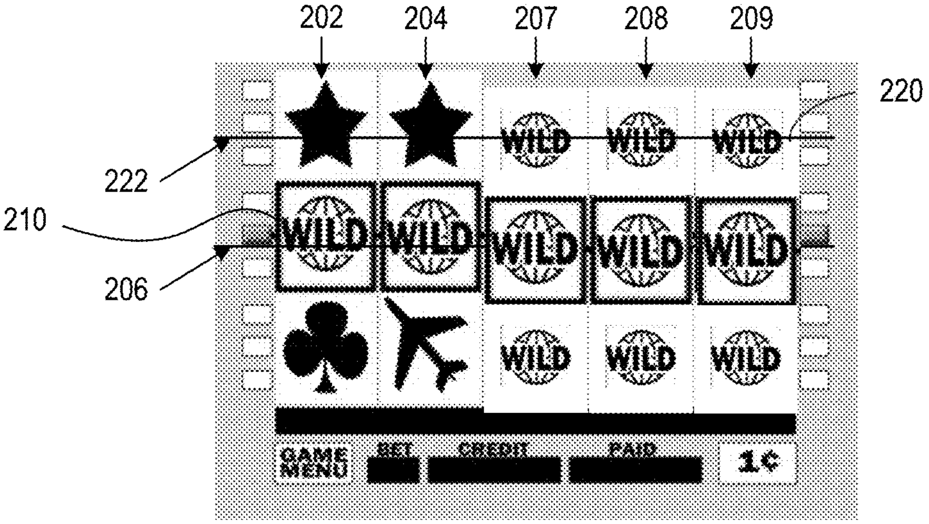

FIGS. 2A-2C illustrate an example various representative embodiments. A single game on a 5-reel slot machine using a 3×5 grid is depicted in this example. When the gaming activity starts, all reels spin as depicted by spinning grid 200 shown in FIG. 2A. When reels 202, 204 stop with wild symbols on the same played line as shown in area 210, criteria for a minimum winning combination (MWC) is met. The MWC criteria in the example shown in FIG. 2B may include 3-like symbols, 2 wild symbols on the same played payline 206, etc. Reels 207-209 continue to spin, as depicted by grid area 220. During this time, an enhanced feature is activated based on the MWC criteria met in view of the wild symbols in area 210. In this embodiment, the enhanced feature includes premium symbols, such as a high percentage of wild symbols which are applied to the symbols of area 220.

Thus, the enhanced feature in the example of FIG. 2B includes replacing reel strips on reels 207-209 with premium reel strips 220. The premium reel strip includes a higher concentration of valuable symbols in a game, such as wild, bonus, high-value, multiplier, and/or other symbols. The premium or high value symbol in the example shown in FIG. 2C is wild symbol 220. The remaining reels stop spinning, and the result is a 5-wild symbol win as shown on payline 206. Another winning result is shown, which is five star symbols on payline 222, with two star symbols in columns 202, 204, and three wild symbols in columns 207-209.

In variations of the above example, the MWC criteria can involve x-like symbols or x-1 wild symbols (consecutively or not) on a played payline, or y-like scatter symbols (not necessarily on a payline). As another variation, the enhanced feature can further comprise enhanced pays, free re-spins, etc. Other visual, audio or other effects may also be provided, such as sound/music, visual features suggestive of or highlighting the temporary suspension of the gaming activity by continuing to spin one or more reels, etc. For example, a visual feature may be to move characters across the screen during the temporary suspension to highlight the delayed feature.

Figure 3A:
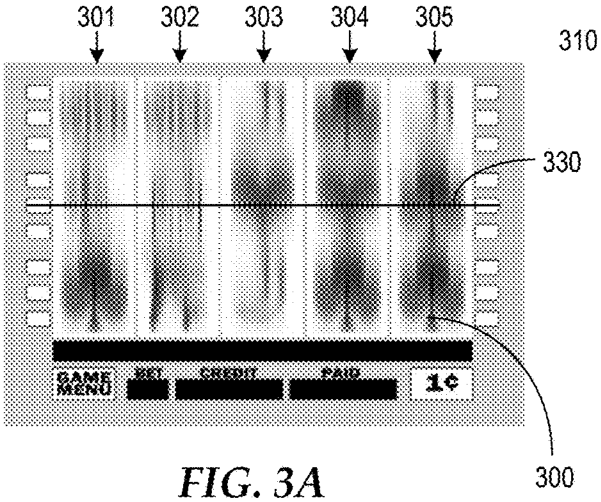
FIGS. 3A-3E illustrate an example of a mid-spin enhancement feature(s) based on a minimum winning combination.
Figure 3D:
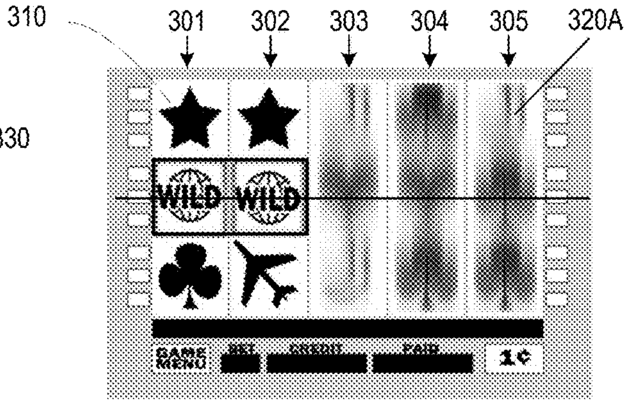
Figure 3B:
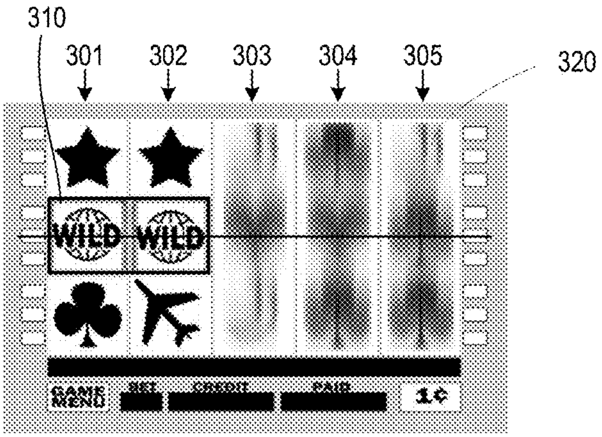
Figure 3E:
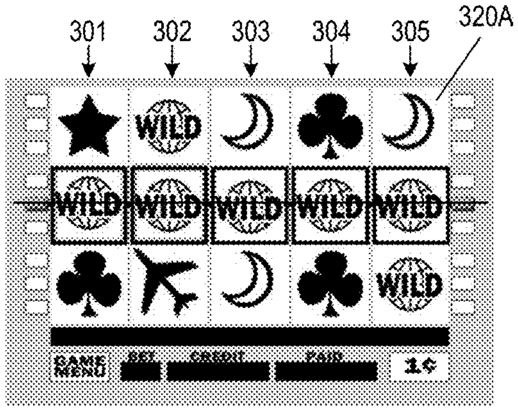
Figure 3C:
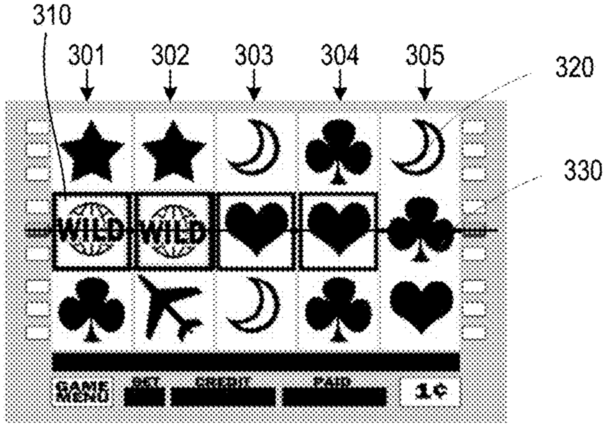

FIGS. 3A-3E illustrate another representative embodiment, where the example includes at least one payline 330 on a 5-reel slot machine using a 3×5 grid. When the game begins, all reels spin as shown by screen area 300 in FIG. 3A. When reels 301 and 302 stop with wild symbols on the same played payline, criteria for an MWC is met as shown at block 310 of FIG. 3B. Reels 303-305 continue to spin as shown by area 320 of FIG. 3B. While the reels 303-305 are spinning, an enhanced feature is activated as a result of the triggered MWC criteria, wherein the enhanced feature is a free re-spin of reels 303-305. More particularly, symbols are presented in area 320 shown in FIG. 3C, resulting in a 4 Heart symbol win on payline 330. Due to the activated enhanced feature, the symbols at reels 301, 302 are held, and reels 303-305 re-spin as depicted by area 320A of FIG. 3D. This provides the player with at least one additional chance to win on any played paylines. After the re-spin, symbols are again presented in area 320A, this time resulting in a 5-wild symbol win as shown in FIG. 3E. As a variation of the example in accordance with various embodiments, the free re-spin feature can involve x re-spins, wherein x can be greater than or equal to one. The variable "x" can be fixed or random, and can be determined by bonus symbols, sub-symbols, or quantities of bonus or sub-symbols. In another variation of the example in accordance with various embodiments, the free re-spin feature can further comprise certain symbols or combinations used to cause the re-spins to continue or terminate.

Another example involving multiple games is again described in connection with a 3×5 grid slot machine, as illustrated in FIGS. 4A-4G. First considering FIG. 4A, when the gaming activity begins, the reels on games 401, 402 and 403 are spun. Game 401 first starts to stop reels (whether column reels, symbol element reels, etc.). For purposes of illustration, columns in FIGS. 4A-4G will be referred to as reels. Reel 411 of game 401 in FIG. 4A stops. A symbol 404, shown as a hinge, is presented adjacent to the wild symbol 405, which indicates that the wild symbol 405 will be opened via the hinge 404 into reel 412. In this example, the opening of the wild symbol 405 will ultimately replicate the wild symbol 404 into column 412, and therefore it is known that the first two symbol locations on reels 411, 412 on payline 406 represent a MWC. Stated alternatively, the hinge 404 in FIG. 4A between reels 411 and 412 is a feature used to duplicate the symbol from the hinge's 404 left side to its right side in this example. Therefore, a wild symbol 405 along with a hinge 404 on its right side guarantees two wild symbols, and consequently 3-like symbols on a same played payline 406. This serves as the "trigger" in the present example, and the reels 412-415 therefore continue to spin.

Figure 4B:
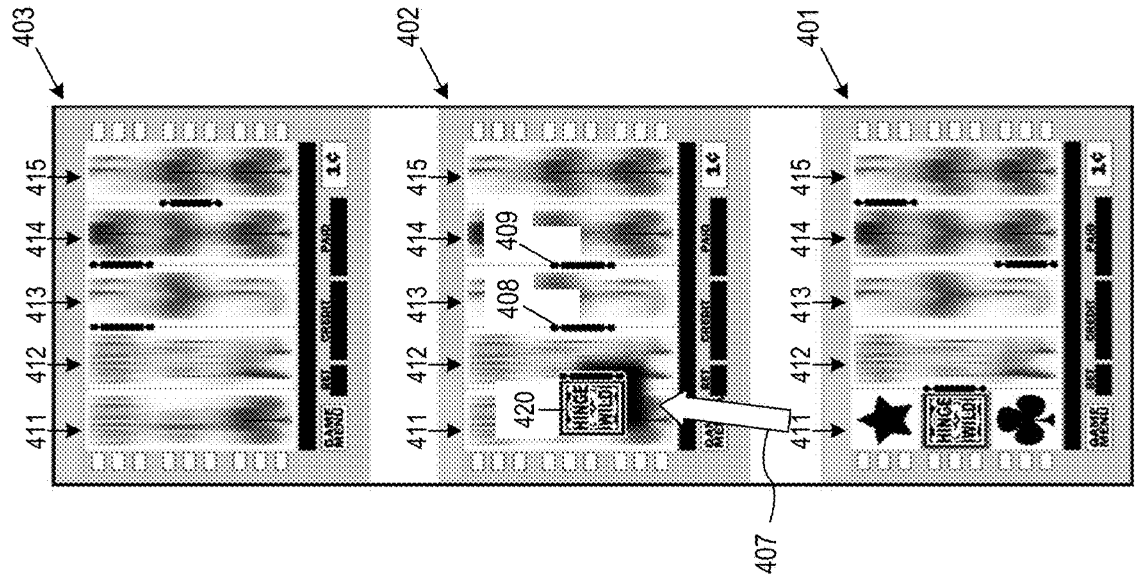
FIGS. 4A-4G illustrate another example of the use of minimum winning combination criteria involving duplicating symbols into one or more additional gaming activities.
Figure 4A:
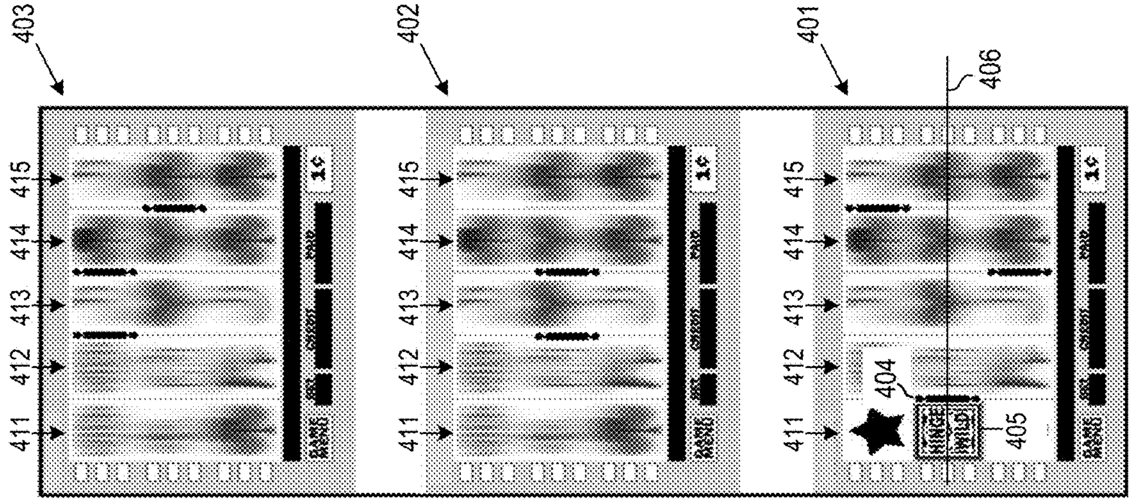

The "hinge" 414 may be one of a plurality of such hinges that are stationary or moving along reel, column, row, etc.

borders. In the illustrated embodiment, one or more hinges 404 move along reel borders, and ultimately stop to determine whether a symbol 405 has stopped adjacent to the hinge 404. An enhanced feature in the embodiment of FIGS. 4A-4G includes duplicating the triggering criteria into a second game 402, which in the present example includes the hinge 404 as the hinge 404 assisted in creating the MWC condition. The symbol(s) responsible for meeting the MWC criteria, which is the wild symbol 405 and hinge 404 in the example of FIG. 4A, are duplicated into game 402 as depicted by arrow 407 of FIG. 4B, and duplicated symbol 420. Game 402 includes its own hinge devices 408, 409 in the example of FIG. 4B.

Figures 4C, 4D, 4E:
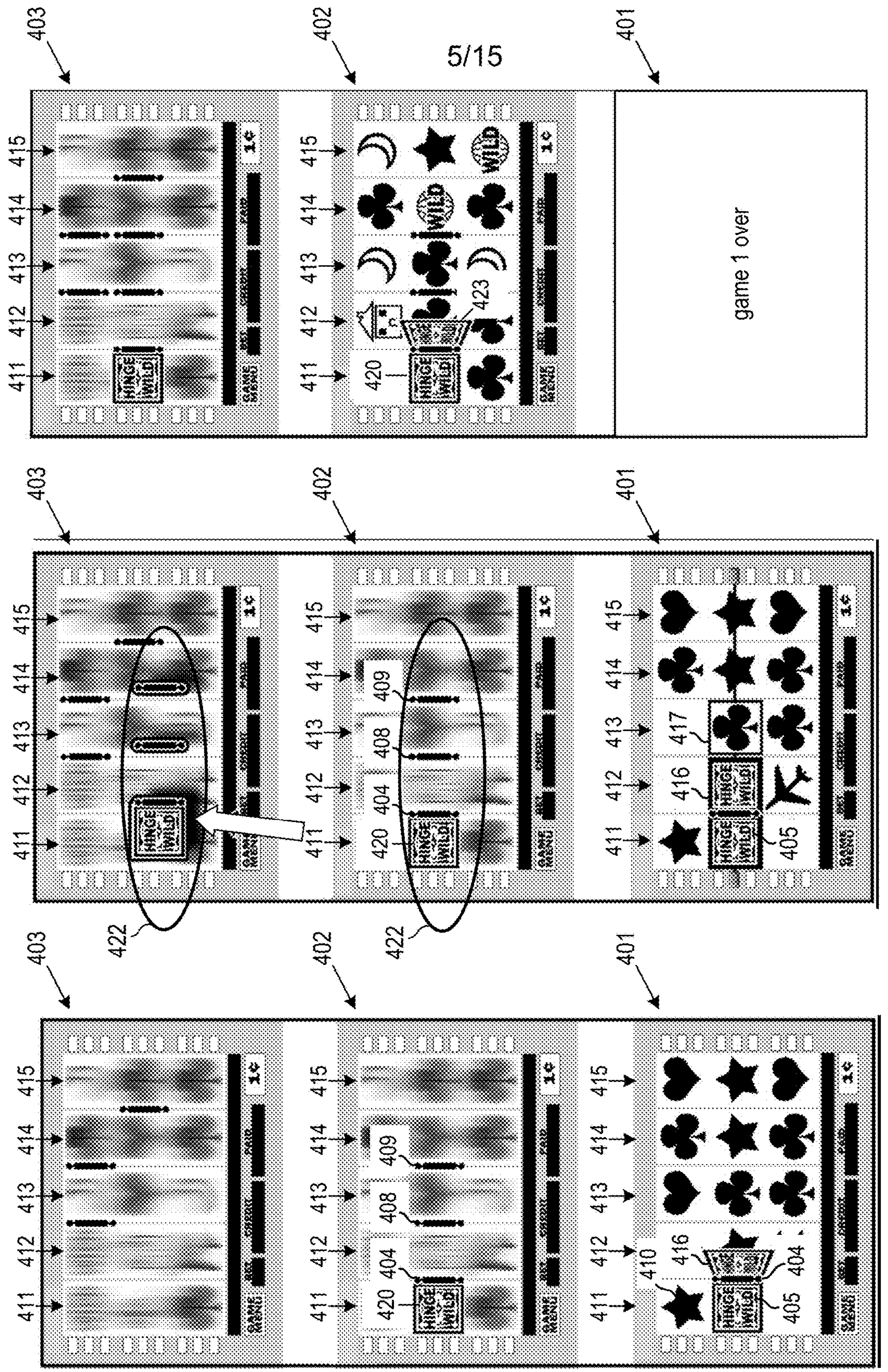

The remaining reels of game 401 stop, and the hinge 405 flip propagates to create another wild symbol 416 as shown in FIG. 4C. The hinge propagation completes, resulting in a 3-clover symbol combination 417 shown in FIG. 4D, which ultimately ends game 401 as shown in FIG. 4E. As previously noted, game 402 of FIG. 4C includes its own hinges 408, 409 between reels 412/413 and 413/414 respectively. The MWC condition in game 402 of FIG. 4D is improved, as a result of the characteristics of the hinges 404, 408 and 409 which duplicate wild symbols on the opposite side of each respective hinge. Thus, the newly improved MWC 422 in game 402, including the wild symbol 420 and the hinges 404, 408, 409, are duplicated to game 403 as shown in FIG. 4D.

Figure 4G:
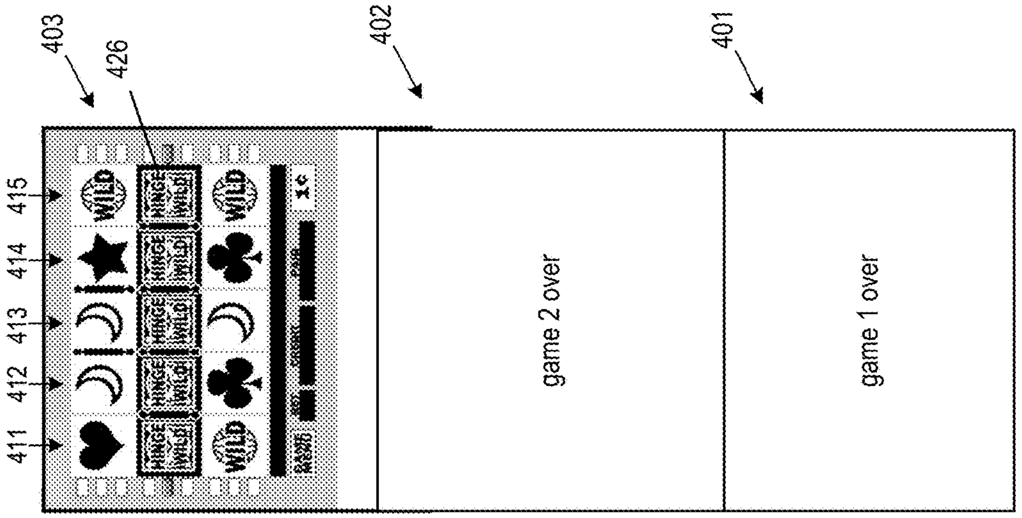
Figure 4F:
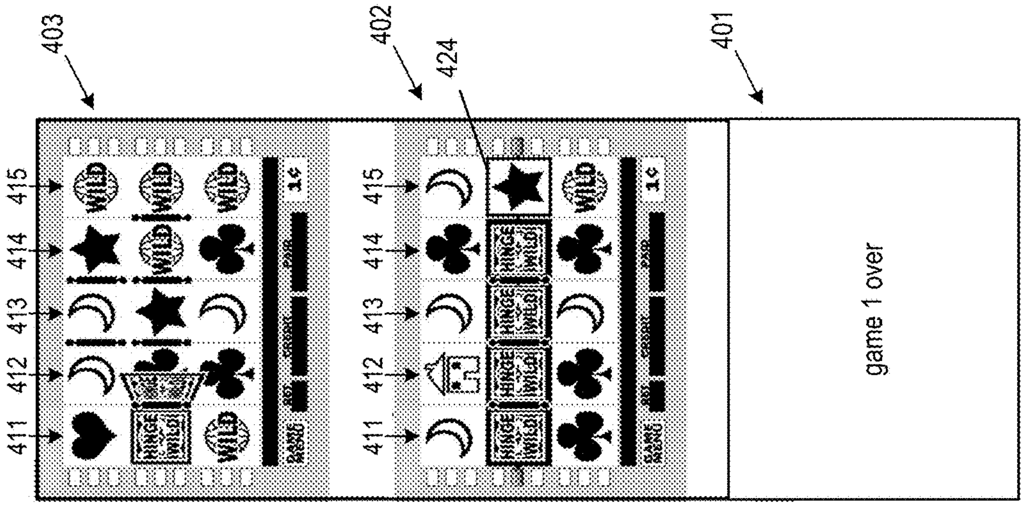

As depicted in game 402 of FIG. 4E, the remaining reels 412-415 of game 402 stop, and the wild symbol 420 folds over to create another wild symbol 423 on reel 412 of game 402. As shown in FIG. 4F, the repeated propagation of the hinge symbols creates a 5-star winning combination 424, and game 402 is then over as shown in FIG. 4G. The remaining reels 412-415 of game 403 stop as shown in FIG. 4F, and the hinge symbols propagate to form the 5-wild winning combination 426, thereby ending the game.

As a variation of this example, the multiple games can include x number of games, where x can be greater than or equal to two, where x can be fixed or random, and may be determined by bonus symbols, sub-symbols, or quantities of bonus or sub-symbols. As another variation, the duplication feature can include duplicating only the MWC from game 401 all other games, versus a game-to-game duplication, regardless of any improved MWC. As yet another variation of the example, any enhanced feature in single game can be activated in any one of the multiple games, due to the MWC criteria.

A bonus bet could be wagered to allow certain feature or enhancements to be available or the game math could determine the appropriate bet for the features. In one embodiment of the multi-game, the player could pre-pay for all games, and allow subsequent games to be available when the feature is activated. Alternatively, the feature on subsequent games may be played at an enhanced pay schedule to accommodate for the increased wagers. These are merely representative of the types of wagering variations that may be employed.

It should also be noted that the "hinge" feature is described in connection with the multi-game embodiment of FIGS. 4A-4G, but any manner of duplicating the triggering MWC may be utilized. For example, where two wild symbols meet the MWC criteria, or three matching symbols meet the MWC criteria, such matching criteria may be duplicated into one or more additional games, without any involvement from the hinges described herein. The embodiments involve duplicating the symbol and/or enhancement feature criteria that gave rise to reaching the MWC, regardless of the manner in which the MWC was reached.

Figure 5:
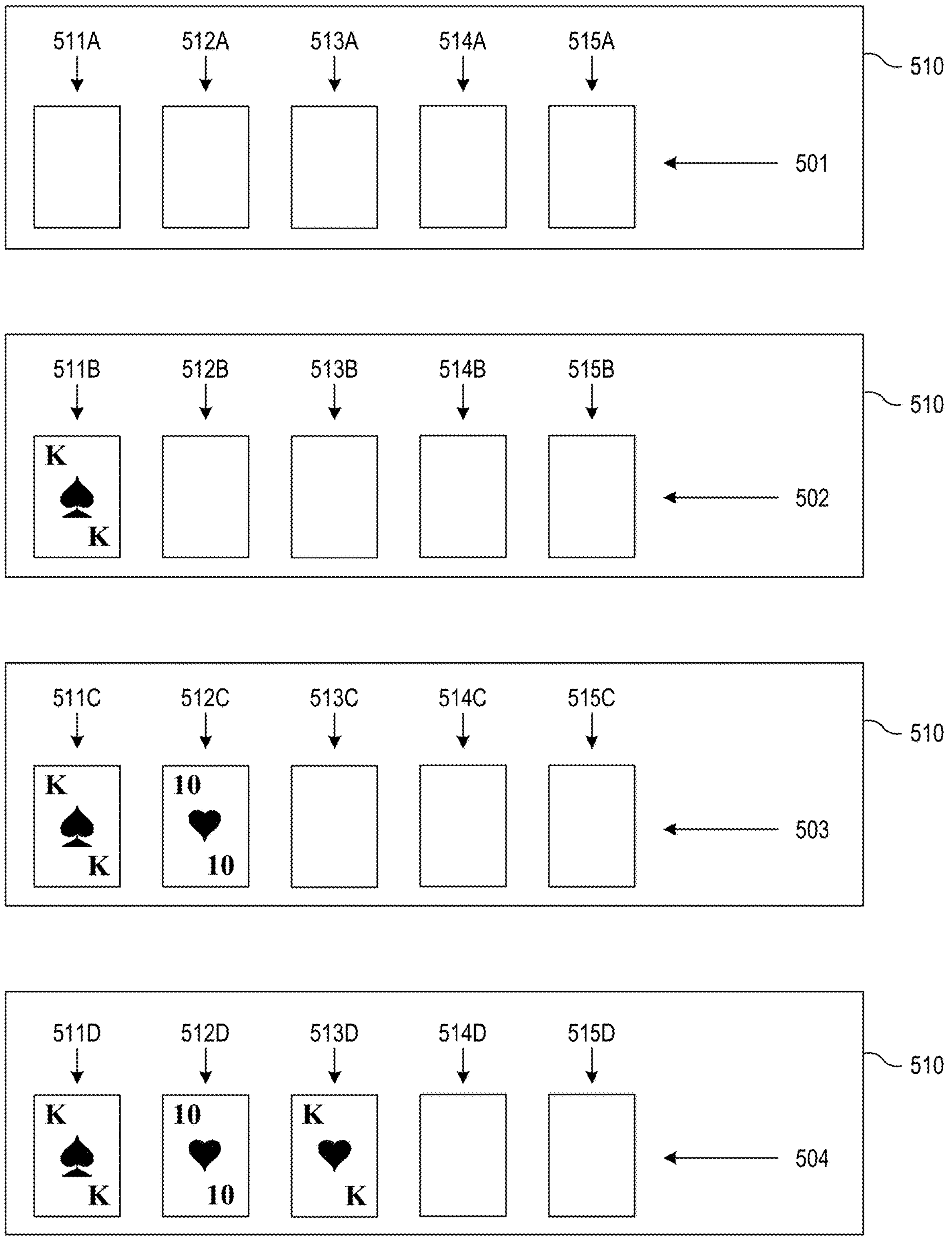
FIG. 5 illustrates a poker embodiment involving a minimum winning combination.

FIG. 5 is a diagram illustrating another embodiment depicting a minimum winning combination feature used in connection with a video poker game. In the illustrated embodiment, a first state 501 of a single hand is presented or "dealt" for viewing on a display 510, including five face-down cards 511A, 512A, 513A, 514A, 515A in the illustrated embodiment. While the present embodiment is depicted in terms of a five-card poker game, the principles described herein may be applied to other card/poker games having a different number of cards. Further, while multiple hands may be dealt, the present example involves one hand.

In this embodiment, a minimum winning combination may be, for example, having at least two like cards (or other minimum poker rank winning combination) prior to at least the last card 515A being dealt in the sequence. FIG. 5 is described in the context of a poker game of "Jacks or Better," where a pair of Jacks represents the lowest poker rank to provide a payout. The new game 501 commences with the five face-down cards 511A, 512A, 513A, 514A, 515A. A first card position 511B receives a card as shown at hand state 502, a second card position 512C receives a card as shown at hand state 503, and a third card position 513D receives a card as shown at hand state 504. At this point, when the King of Hearts is dealt to position 513D, a minimum winning combination is achieved, as a pair of Kings is present in card positions 511D and 513D. When this occurs, the final card positions 514D, 515D may remain face-down while at least one enhanced feature is presented. In one embodiment, the enhanced feature is presented in an anticipatory manner, such as displaying a multiplier of increasing value until it finalizes a value, scrolling through random multipliers until it finalizes a value, etc.

Another example of a minimum winning combination is when at least a pair of wild cards are presented in the first two positions 511A, 512A. For example, in a game where the card "2" is wild, if a "2" is presented in card positions 511A, 512A, it is known that at least a pair of Jacks is achieved (where a pair of Jacks is a minimum hand to achieve a payout). In another embodiment, if a Jack or better is presented in the first two card positions 511A, 512, and a wild card is presented in the first two card positions 511A, 512, the minimum winning combination is achieved (where a pair of Jacks is a minimum hand to achieve a payout). These are merely representative examples, as analogous minimum winning combinations are possible depending on, for example, the particular game symbols and payout thresholds of the particular game.

FIGS. 6A-6D depicts another example of a poker game, which includes multiple hands. In one embodiment, multiple hands result from a minimum winning combination occurring, while in other embodiments, multiple hands may be expressly played such as by submitting additional player credits or other assets to play multiple games concurrently. In the illustrated embodiment, the game commences on a first hand 600, where four cards 602, 604, 606, 608 are shown to have been dealt. In this example, each "2" is wild, and three-of-a-kind or better results in a payout. When the fourth card 608 has been dealt, a minimum win of at least three-of-a-kind is guaranteed due to the two wild cards 602, 608 having been dealt 512. Thus, the criteria for a minimum winning combination is created with one more card to be dealt, such as at position 610 of hand 600.

Figure 6A:
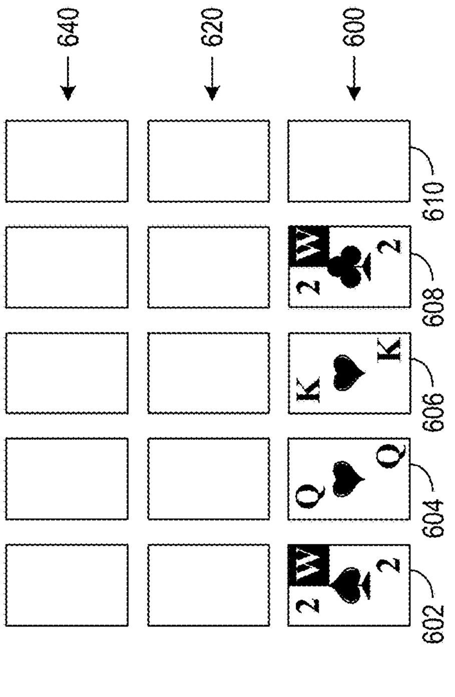
FIGS. 6A-6D illustrates a poker embodiment utilizing a minimum winning combination, and the duplication of at least part of the minimum winning combination into one or more other gaming activities.
Figure 6B:
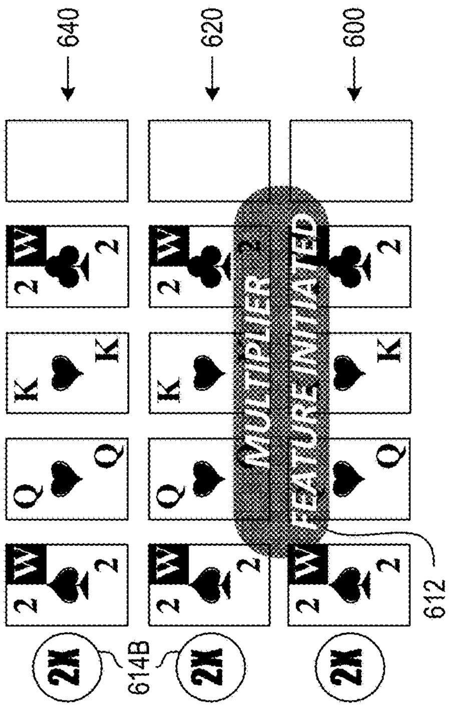

FIG. 6B illustrates a representative example of one or more enhanced features associated with the occurrence of a minimum winning combination. A notification 612 of the invocation of the feature may be presented. When the three-of-a-kind occurs, the cards involved in the minimum winning combination are duplicated from hand 600 into one or more hands 620, 640. Additionally, an incrementing multiplier 614B may be provided for each of the original hand(s) 600 and duplicated hand(s) 620, 640. The multipliers 614B may be the same for each of the hands 600, 620, 640, or one or more of the hands 600, 620, 640 may be associated with a multiplier that is different than one or more of the other hands.

Figure 6C:
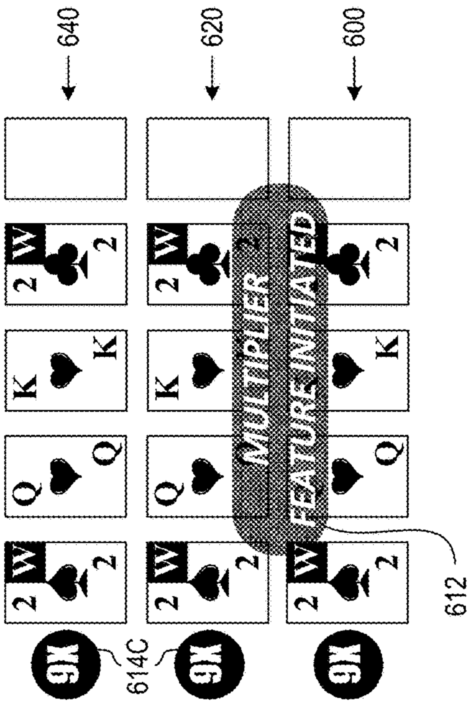
Figure 6D:
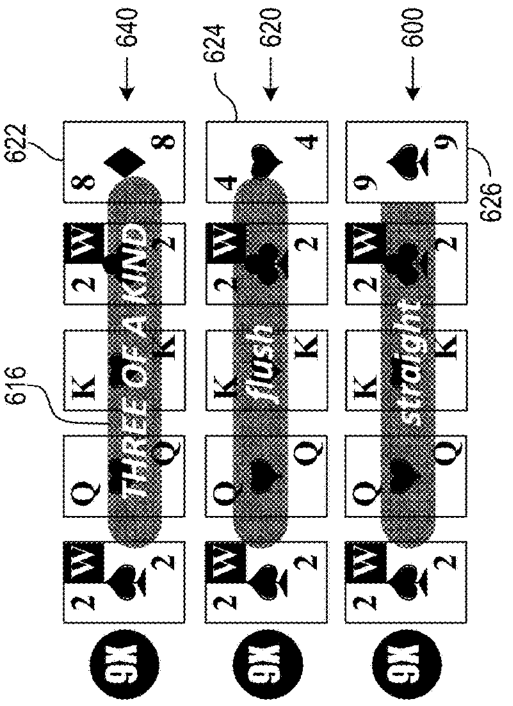

In the illustrated embodiment, the multipliers continue to increment as noted by the multipliers 614C of FIG. 6C. The incrementing or other changing of the multipliers eventually stop changing, and the remaining cards 622, 624, 626 are revealed as shown in FIG. 6D. In this example, hand 600 results in a straight, hand 620 results in a flush, and hand 640 results in three-of-a-kind. Notifications such as notification 616 may be presented to identify the resulting poker rank.

As representative variations of the minimum winning combination examples, the MWC criteria can involve "x-of-a-kind," where "x" is two or more (e.g., no card value constraint, "Jacks or better", etc.), "two pair," "one card away from Straight," and "one card away from Flush," or the like, prior to dealing one or more cards to complete the hand. As another representative variation in accordance with alternative embodiments, the multiplier feature can involve incrementing multipliers or other enhanced features at the same or different value, change rates, etc. for each hand. For example, multipliers or other enhanced features for each hand could be generated from the same table or different tables. They could all start and stop at the same time or at different times. They could appear sometimes or always. As another variation of the example in accordance with various embodiments, x hands game can be played, and any enhanced feature in 5-reel slot machine can be activated in any one of the x hands when applicable, including premium decks or card sets and free re-deal, due to the MWC criteria.

Figure 7:
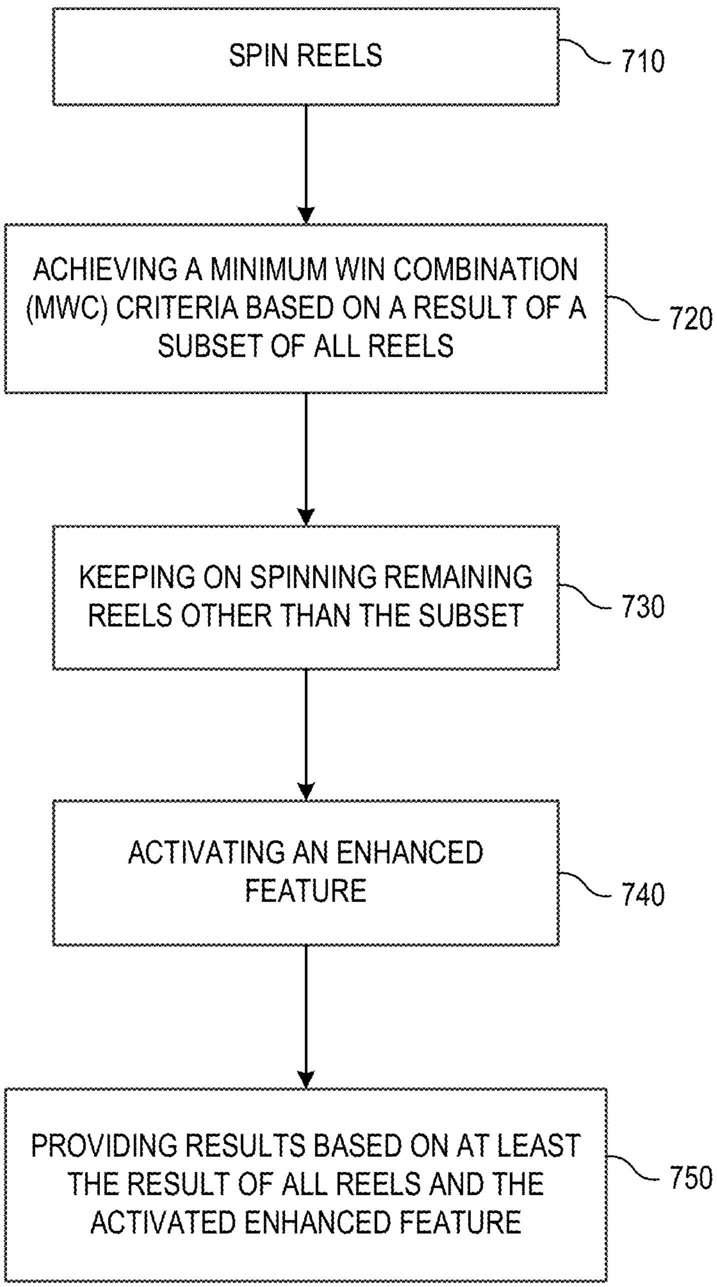
FIG. 7 is a flow diagram illustrating an embodiment for using partial symbol results as criteria for providing one or more enhanced features prior to completion of the symbol presentation event.

FIG. 7 illustrates a representative gaming method in accordance with one embodiment. The process involves spinning 710 or otherwise randomizing the reels on a slot game. In the illustrated embodiment, a minimum winning combination (MWC) is achieved 720 based on a result of a subset of all reels. The remaining reels other than the subset continue to spin 730, or the symbols associated therewith otherwise remain unknown, while an enhanced feature is activated 740 on the remaining reels. Results are provided 750 based on at least the result of all reels and the activated enhanced feature. As previously noted, the slot game can include any number of individual reels, rows, columns, column reels, row reels, etc. Thus, "reels" associated with the minimum winning combination or the remaining reels may each present one or more symbols. According to other embodiments, the process can be used in a method for other gaming systems, including card games, etc.

Figure 8:
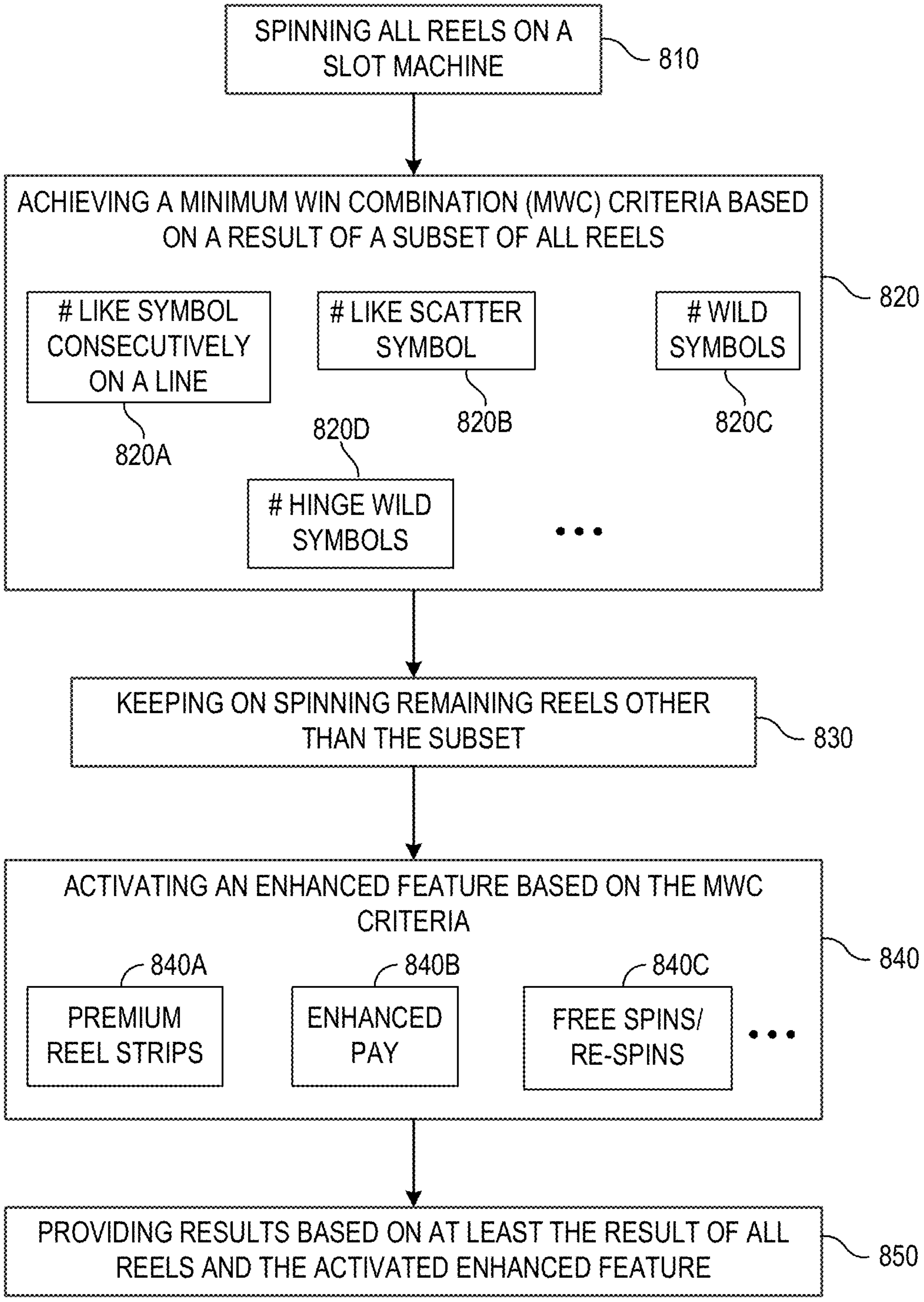
FIGS. 8-9 are flow diagrams illustrating representative variations of slot game embodiments for using partial symbol results as criteria for providing one or more enhanced features prior to completion of the symbol presentation event.

FIG. 8 illustrates another representative process of providing a mid-spin enhanced feature in response to a winning combination on a subset of the reels. The reels are spun 810 or otherwise randomized. A minimum winning combination is achieved 820 as a result of criteria on a subset of the reels being met. Examples of such criteria include a number of like symbols consecutively on a line as shown at block 820A, a like number of scatter symbols as shown at block 820B, a number of wild symbols as shown at block 820C, a number of hinge wild symbols as shown at block 820D, etc. As the remaining reels continue spinning 830, an enhanced feature is activated 840 based on the minimum winning combination criteria. Examples of such enhanced features include providing one or more premium reel strips as shown at block 840A, enhancing a payout as shown at block 840B, providing free spins or re-spins as shown at block 840C, etc. As examples, enhanced pay features of block 840B include, but are not limited to, fixed or random multipliers, other mathematically increasing functions (e.g., exponent, factorial, etc.), etc. Results are provided 850 based on at least the result of the reel symbols and the activated enhanced feature. As noted above, some results may involve applying the enhanced feature to payouts from the reels (e.g., multiplying a multiplier times one or more payouts on winning paylines), applying the enhanced feature independently (e.g., awarding free spins), or the like.

Figure 9:
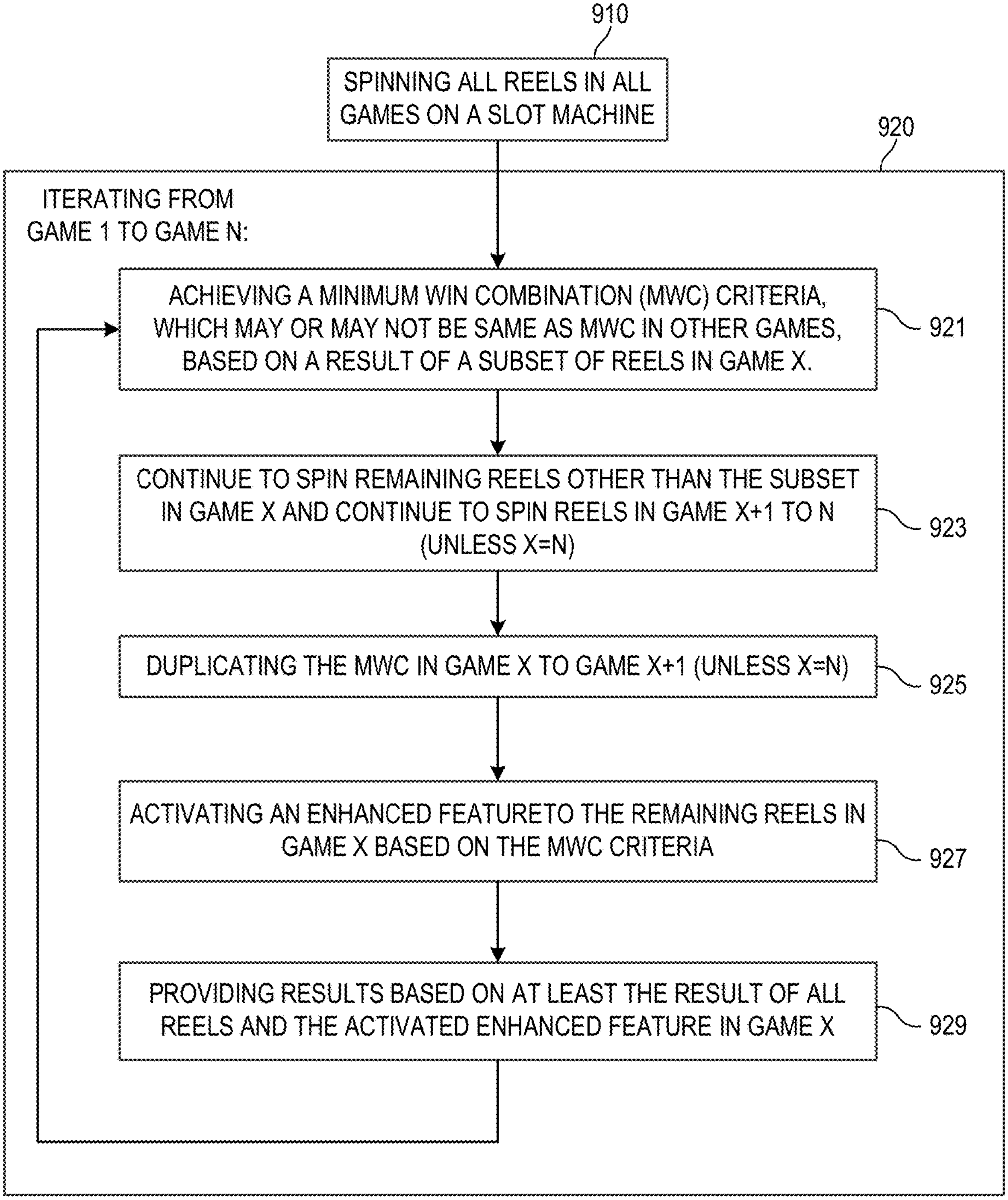

FIG. 9 illustrates a representative embodiment for a multi-game system in accordance with other embodiments. After spinning 910 all reels in all games on a slot machine, the process shown in FIG. 9 further involves iterating 920 from Game 1 to Game N, assuming N games in total. Each iteration step involves achieving 921 a minimum win combination (MWC) criteria, which may or may not be same as the MWC in other games, based on a result of a subset of reels in Game X. Each iteration further includes continuing 923 to spin remaining reels other than the subset in Game X, and continuing to spin reels in Game X+1 to N (unless X=N); duplicating 925 the MWC in Game X to Game X+1 (unless X=N); activating 927 an enhanced feature (which may or may not be same as enhanced features in other games) to the remaining reels in Game X based on the MWC criteria; and providing 829 results based on at least the result of all reels and the activated enhanced feature in Game X. Notice each MWC and each enhanced feature in a single game system can be used in each one of the multiple games in this embodiment.

Figure 10:
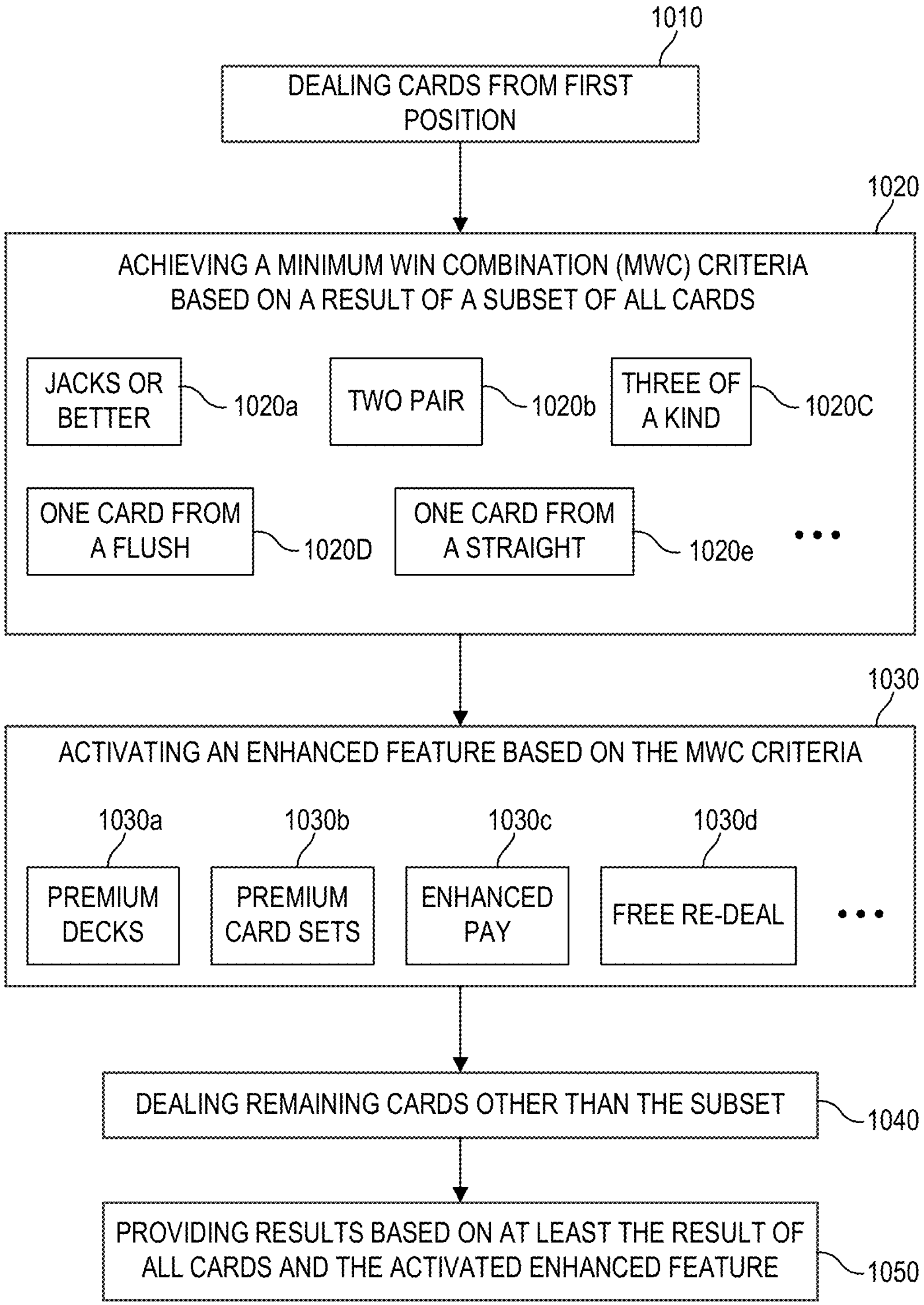
FIGS. 10-11 are flow diagrams illustrating representative variations of poker embodiments for using partial poker hand results as criteria for providing one or more enhanced features prior to completion of the poker hand presentation.

FIG. 10 illustrates a process for another representative gaming system in accordance with various embodiments. The process in FIG. 10 involves dealing 1010 cards starting at a first position, and achieving 1020 a minimum win combination based on criteria of a result of a subset of the dealt cards. The minimum winning combination may involve, for example, a pair such as Jacks or better 1020A, two pair 1020B, three-of-a-kind 1020C, one card away from obtaining a flush 1020D or straight 1020E, or any other desired combination. An enhanced feature is activated 1030 when the particular minimum winning combination has occurred. The enhanced feature may include, for example, premium decks 1030A (e.g., decks having cards of a higher probability of a winning payout and/or a higher payout), premium card sets 1030B, enhanced pays 1030C, free additional deals or re-deals 1030D, etc. Results may be provided 1050 based on at least the result of the dealt cards and the activated enhanced feature.

Figure 11:
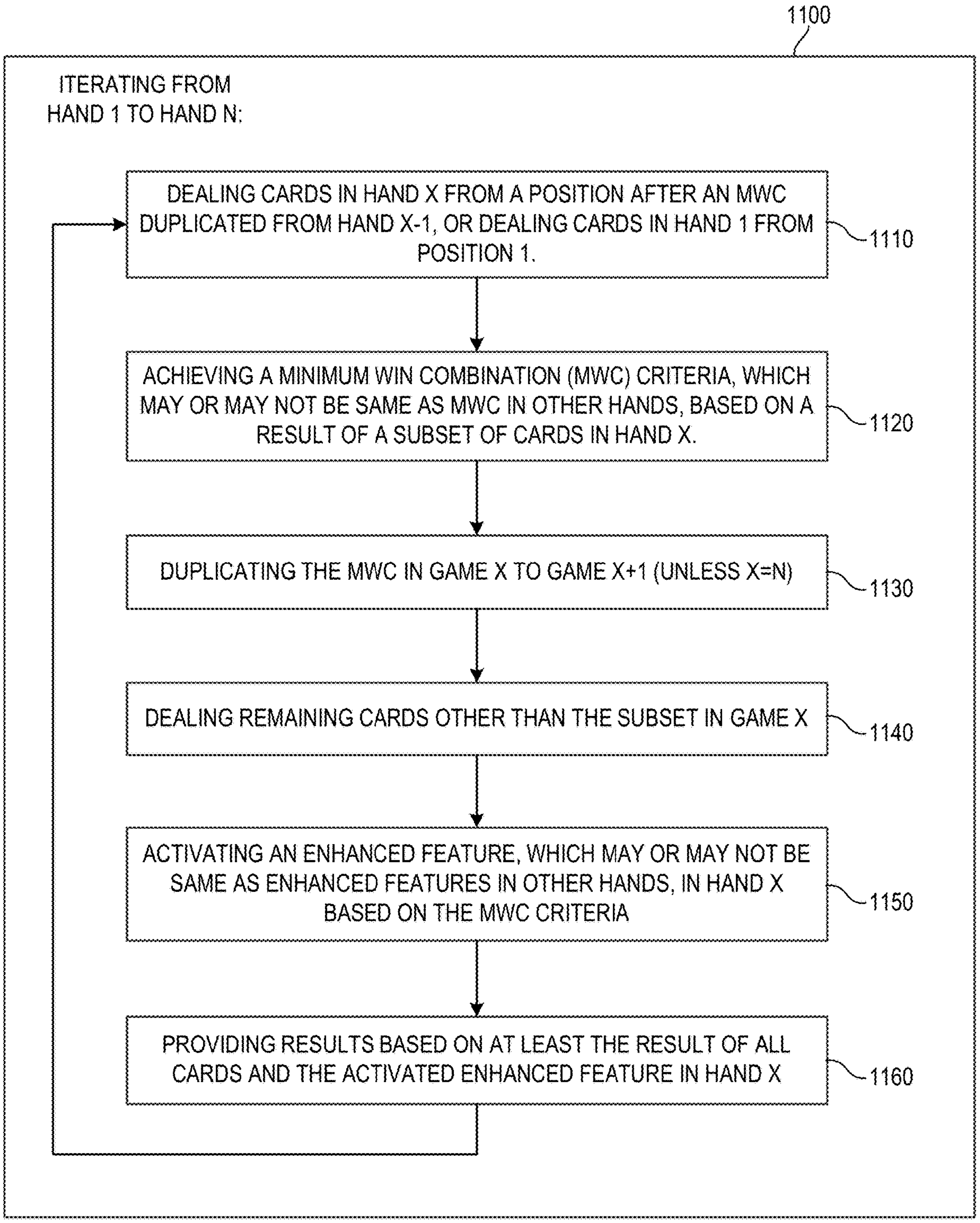

FIG. 11 illustrates a process for another multi-game system in accordance with various embodiments. The process shown in FIG. 11 involves iterating 1100 from Hand 1 to Hand N, assuming an N-hand card game is involved. Each iteration step involves dealing 1110 cards in Hand X from a position after an MWC duplicated from Hand X−1, or dealing cards in Hand 1 from position 1; achieving 1120 a minimum win combination (MWC) criteria, which may or may not be same as MWC in other hands, based on a result of a subset of cards in Hand X; duplicating 1130 the MWC in Game X to Game X+1 (unless X=N); dealing 1140 remaining cards other than the subset in Game X; activating 1150 an enhanced feature, which may or may not be same as enhanced features in other hands, in Hand X based on the MWC criteria; and providing 1160 results based on at least the result of all cards and the activated enhanced feature in Hand X. Notice each MWC and each enhanced feature in single hand system can be used in each one of the multiple hands.

Figure 12:
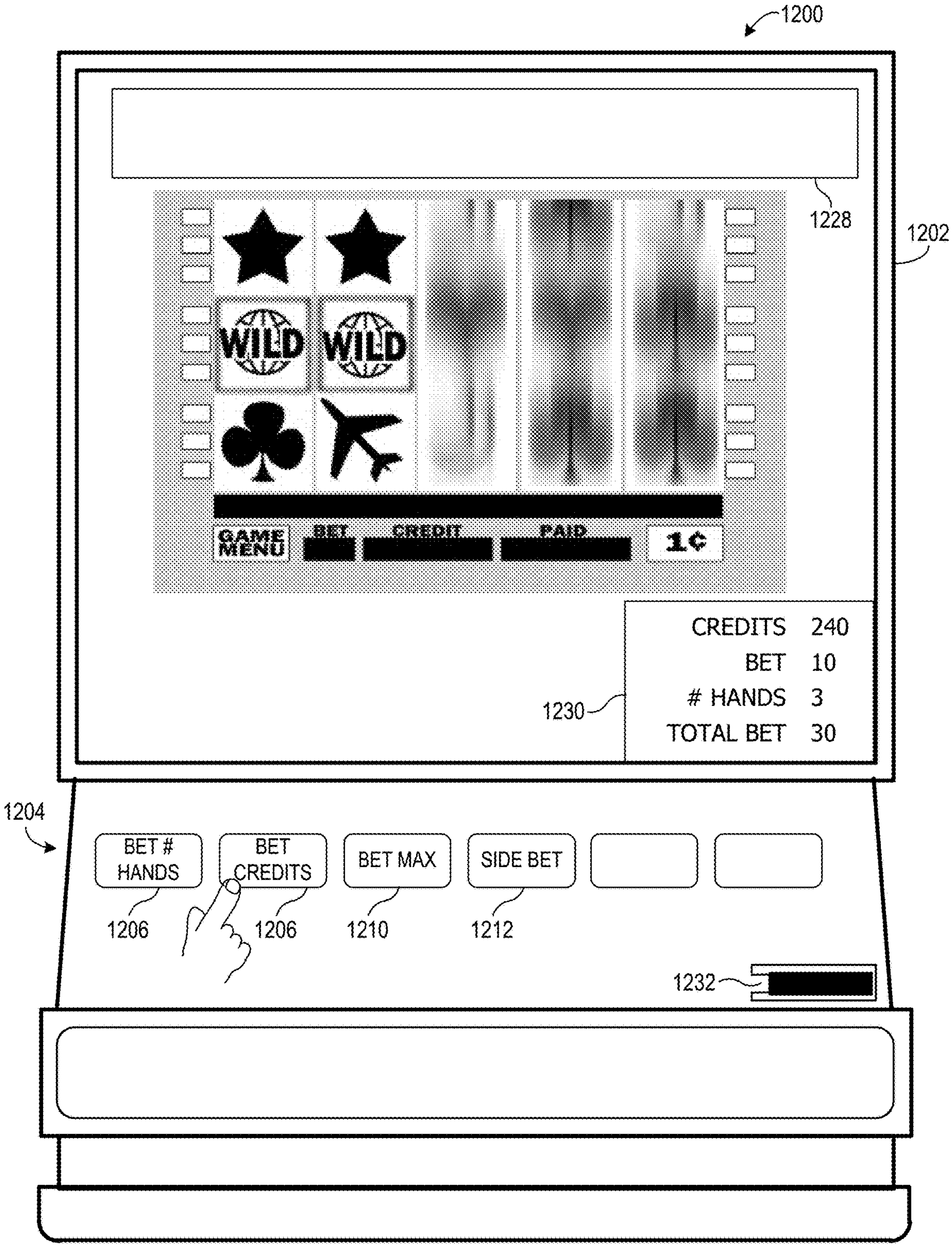
FIG. 12 illustrates a representative embodiment of a casino-style gaming device in which the principles described herein may be applied.

The features described herein may be used in connection with slot machines, computing devices and/or other gaming devices. FIG. 12 illustrates a representative embodiment of a casino-style gaming device in which the principles described herein may be applied. For purposes of explanation, the description of the gaming device is FIG. 12 is provided in terms of a kiosk, slot machine, or video poker machine 1200. However, the techniques and devices described herein may analogously be implemented in other computer-based systems.

The illustrated gaming machine 1200 includes a computing system (not shown) to carry out operations according to the disclosure. The illustrated gaming machine 1200 includes a display 1202, and a user interface 1204, although some or all of the user interface may be provided via the display 1202 in touch screen embodiments. The user interface 1204 allows the user to control and engage in play of the gaming machine 1200. The particular user interface mechanisms associated with user interface 1204 is dependent on the type of gaming machine. For example, the user interface 1204 may include one or more buttons, switches, joysticks, levers, pull-down handles, trackballs, voice-activated input, or any other user input system or mechanism that allows the user to play the particular gaming activity.

The user interface 1204 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/token input mechanisms, card readers, credit card readers, smart card readers, punch card readers, and other mechanisms may be used to enter wagers. It is through the user interface 1204 that the user can initiate and engage in an electronic gaming activity as described herein. For example, the player can use the user interface 1204 and/or touch screen inputs to indicate the number of hands to play 1206, place wagers 1208, make gaming decisions (e.g., bet max) 1210, place side bets 1212 that will otherwise make the player eligible for such features, etc. While the illustrated embodiment depicts various buttons for the user interface 1204, it should be recognized that a wide variety of user interface options may be used, including pressing buttons, touching a segment of a touch-screen, entering text, entering voice commands, or other known user entry methodology.

The display device 1202 may include one or more of an electronic display, a mechanical display, and fixed display information such as paytable information associated with a glass/plastic panel 1228. A display segment or panel 1230 may also be provided to present information such as the accumulated credits, current bet amount such as "10" credits (where credits may represent, for example, coins, tokens, dollars, etc.), the number of hands played, total bet, the number of credits paid out or "won" on a particular play, etc. A wager acceptor 1232 is operative to receive wager tokens, coins, bills, credit/debit cards, coupons, smart cards, prepaid casino cards, electronic fund transfer (EFT), tickets, and the like.

Figure 13:
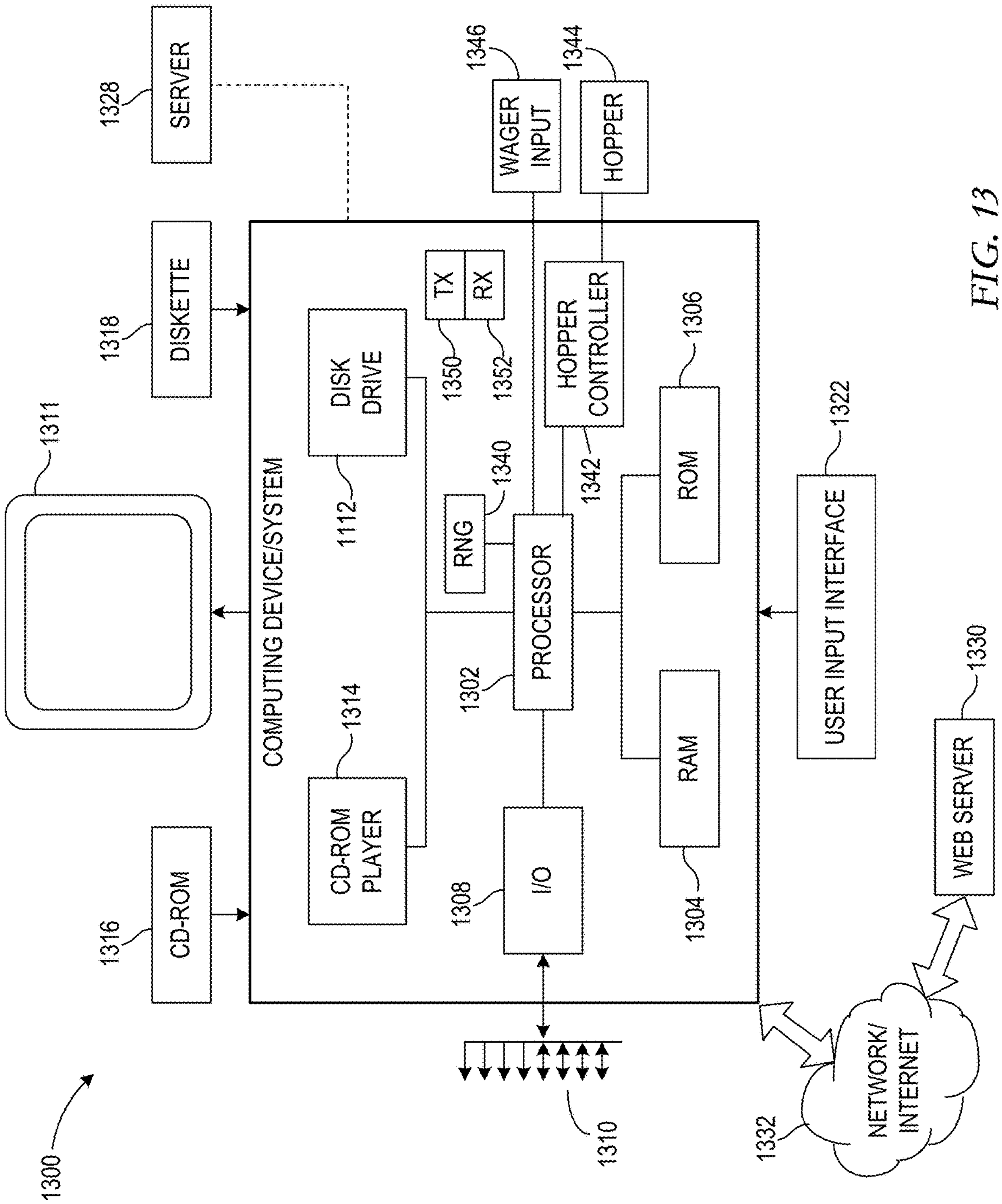
FIG. 13 depicts a representative computing system capable of carrying out operations and features in accordance with the disclosure.

As noted above, the device 1200 may be implemented as a casino gaming machine such as a video poker machine or other special purpose gaming kiosk as described in FIG. 12, or may be implemented via computing systems operating under the direction of local gaming software, and/or remotely-provided software such as provided by an application service provider (ASP), etc. The casino gaming machine may utilize a computing system to control and manage the gaming activity. An example of a representative computing system capable of carrying out operations in accordance with the disclosure is illustrated in FIG. 13.

Hardware, firmware, software or a combination thereof may be used to perform the various gaming functions, display presentations and operations described herein. The functional modules in accordance with the disclosure may reside in a gaming machine as described, or may alternatively reside on a stand-alone or networked computing device/system. The computing structure 1300 of FIG. 13 is an exemplary computing structure that can be used in connection with such electronic gaming machines, computers, or other computer-implemented devices to carry out operations described herein. It should be noted that the representative computing structure of FIG. 13 or analogous computing structure may be used on a local computer, kiosk, server, or any other device providing or serving the gaming functions. It should also be noted that the computing arrangement of FIG. 13 may be distributed across multiple devices (e.g., processing components at a server, and display and user interface components at a local gaming machine, etc.).

The example computing arrangement 1300 suitable for performing the gaming functions according to the disclosure typically includes a central processor (CPU) 1302 coupled to random access memory (RAM) 1304 and some variation of read-only memory (ROM) 1306. The ROM 1306 may also represent other types of storage media to store programs, such as programmable ROM (PROM), erasable PROM (EPROM), etc. The processor 1302 may communicate with other internal and external components through input/output (I/O) circuitry 1308 and bussing 1310, to provide control signals, communication signals, and the like.

Chance-based gaming systems such as video poker machines, in which the present disclosure is applicable, may be governed by random numbers and processors. A display device 1311 is used to display the gaming activity as facilitated by one or more random number generators (RNG). RNGs are known in the art, and may be implemented using hardware, software operable in connection with the processor 1302, or some combination of hardware and software. Any known RNG may be used, and may be integrally programmed as part of the processor 1302 operation, or alternatively may be a separate RNG controller 1340.

The computing arrangement 1300 may also include one or more data storage devices, including hard and floppy disk drives 1312, CD-ROM drives 1314, and other hardware capable of reading and/or storing information such as DVD, FLASH drives, etc. In one embodiment, software for carrying out operations in accordance with the disclosure may be stored and distributed on a CD-ROM 1316, diskette 1318, DVD, FLASH device or other form of media capable of portably storing information. These storage media may be inserted into, and read by, devices such as the CD-ROM drive 1314, the disk drive 1312, etc. The software may also be transmitted to the computing arrangement 1300 via data signals, such as being downloaded electronically via a network, such as the Internet. Further, as previously described, software for carrying out functions associated with the present disclosure may alternatively be stored in internal memory/storage of the computing device 1300, such as in the ROM 1306 or other storage.

The computing arrangement 1300 may be coupled to the display 1311, which represents a display on which the gaming activities may be presented. The display 1311 may be any type of known display or presentation screen, such as LCD displays, plasma display, cathode ray tubes (CRT), etc. Where the computing device 1300 represents a stand-alone or networked computer, the display 1311 may represent a standard computer terminal or display capable of displaying multiple windows, frames, etc. Where the computing device is embedded within an electronic gaming machine (see FIG. 12), the display 1311 corresponds to the display screen 1202 of the gaming machine/kiosk. A user input interface 1322 such as a mouse, buttons, keyboard/keypad, microphone, touch pad, trackball, joystick, touch screen, voice-recognition system, etc. may be provided.

The computing arrangement 1300 may be connected to other computing devices or gaming machines, such as via a network. The computing arrangement 1300 may be connected to a network server 1328 in an intranet or local network configuration. The computer may further be part of a larger network configuration as in a global area network (GAN) such as the Internet. In such a case, the computer may access one or more web servers 1330 via the network/ Internet 1332.

Other components directed to gaming machine implementations include manners of gaming participant payment, and gaming machine payout. For example, a gaming machine including the computing arrangement 1300 may also include a hopper controller 1342 to determine the amount of payout to be provided to the participant. The hopper controller may be integrally implemented with the processor 1302, or alternatively as a separate hopper controller 1342. A hopper 1344 may also be provided in gaming machine embodiments, where the hopper serves as the mechanism holding the coins/tokens of the machine. The wager input module 1346 represents any mechanism for accepting coins, tokens, coupons, bills, electronic fund transfer (EFT), tickets, credit cards, smart cards, membership cards, etc., for which a participant inputs a wager amount.

Additionally, the computing arrangement 1300 may include a transmitter (TX) 1350, and may include a receiver (RX) 1352. These TX 1350 and RX 1352 components may be discrete components, or aggregated such as in the case of a transceiver. The receiver function provided by the RX 1352 can be configured to receive information from any type of network, such as a local area network (LAN), wireless LAN (e.g., 802.11 a/b/g/n), wired network (e.g., Internet), wireless network (e.g., Global System for Mobile Communications/General Packet Radio Service (GSM/GPRS), proximity networks (e.g., Bluetooth, peer-to-peer networks), and/or other wired/wireless network technologies. For example, the RX 1352 may receive programming and/or operational information from a server 1328 or 1330 where the system is server-based. Any such server may include computing components analogous to those depicted in FIG. 13. Information such as wager information or other data used by a server can be provided to the appropriate server 1328, 1330 or other device or network entity via the TX 1350. It should also be recognized that the computing arrangement 1300 of FIG. 13 may be implemented in a gaming apparatus, or in a server or other network entity.

The foregoing description of the exemplary embodiments has been presented for the purposes of illustration and description. It is not intended to be exhaustive or to limit the invention to precise forms that are disclosed. Many modifications and variations are possible in light of the above teaching. For example, the present disclosure is equally applicable in electronic or mechanical gaming machines.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

The invention claimed is:

1. A gaming device comprising:

a display operable to display a first game grid and a second game grid, where the first game grid includes a first plurality of card positions, and where the second game grid includes a second plurality of card positions, where the first plurality of card positions includes N number of card positions;

a wager input device configured to accept physical items associated with a currency value;

a memory configured to store a credit amount and a plurality of virtual playing cards; and a processor operable to:

receive a signal indicating that a physical item associated with a currency value has been received at the wager input device;

increase the credit amount stored in memory based on the credit value associated with the received physical item;

receive a signal to initiate a poker game in response to placement of a wager, the wager decreasing the credit amount;

deal a plurality of virtual playing cards to the first plurality of cards positions on the display, where after each card is dealt until a card is dealt to the N-1 card position, determining if the currently dealt subset of cards satisfies a predefined minimum win criteria;

when it is determined that the currently dealt subset of cards satisfies a minimum win criteria:

stop dealing additional virtual playing cards to the first game grid on the display, duplicate the currently dealt cards in the first game grid into corresponding ones of the second card positions in the second game grid, after duplicating the dealt cards in the first game grid to the second game grid, activating an enhanced feature by applying a multiplier to the first game grid and to the second game grid, deal additional virtual playing cards to the remaining card positions in the first game grid, deal additional virtual player cards to the remaining card positions in the second game grid, evaluate a first poker hand formed from the cards in the first card positions in the first grid, evaluate a second poker hand formed from the cards in the second card positions in the second grid, and provide awards based on the evaluated first poker hand and the evaluated second poker hand, where any provided awards are multiplied by the applied multiplier; and increase the credit amount stored in memory based on any provided awards.

2. The gaming device of claim 1, wherein the processor is further operable to deal playing cards to the second card positions in the second game grid independent of the first game outcome when the cards in the first game grid do not satisfy the minimum win criteria.

3. The gaming device of claim 1, wherein activating the enhanced feature includes presenting a visual anticipation event.

4. The gaming device of claim 1, wherein the minimum win criteria includes a combination of virtual playing cards that is associated with a payout amount in a poker paytable.

5. A gaming device comprising:

a game display;

a wager input device configured to accept physical items associated with a currency value;

a memory configured to store a credit amount and a poker paytable; and a processor operable to:

receive a signal indicating receipt of physical item associated a currency value from the wager input device;

increase the credit amount based on the received signal indicating receipt of the physical item associated with a currency value;

receive a signal to initiate a poker game in response to placement of a wager, the wager decreasing the credit amount;

deal a first virtual playing card to a first card position on the game display;

determine if the first virtual playing card satisfies a minimum win condition based on the poker paytable;

when the first virtual playing card satisfies the minimum win condition:

initiate an enhancement feature by randomly determining a bonus multiplier, and deal additional virtual playing cards to complete a dealt poker hand on the game display;

when the first virtual playing card does not satisfy the minimum win condition:

deal a second virtual playing card to a second card position on the game display, and initiate the enhancement feature by randomly determining a bonus multiplier when a combination of the dealt first virtual playing card and the dealt second virtual playing card satisfies the minimum win condition, when a final poker hand is displayed on the game display, evaluate the final poker hand for awards; and increase the credit amount based on any awards multiplied by any bonus multiplier associated with the evaluated final poker hand.

* * * * *